US012773920B2

(12) United States Patent
Schmidt et al.

(10) Patent No.: US 12,773,920 B2
(45) Date of Patent: Oct. 27, 2026

(54) METHOD FOR OPERATING A BATTERY

(71) Applicant: SEW-EURODRIVE GMBH & CO. KG, Bruchsal (DE)

(72) Inventors: Josef Schmidt, Philippsburg-Huttenheim (DE); Matthias Hauck, Schwetzingen (DE); Jens Schäfer, Graben-Neudorf (DE); Thomas Zöller, Bruchsal (DE); Manuel Baena, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 507 days.

(21) Appl. No.: 18/681,134

(22) PCT Filed: Jul. 11, 2022

(86) PCT No.: PCT/EP2022/069340
§ 371 (c)(1),
(2) Date: Feb. 5, 2024

(87) PCT Pub. No.: WO2023/011862
PCT Pub. Date: Feb. 9, 2023

(65) Prior Publication Data

US 2024/0367542 A1 Nov. 7, 2024

(30) Foreign Application Priority Data

Aug. 4, 2021 (DE) ........................ 102021004015.5

(51) Int. Cl.
*B60L 53/62* (2019.01)
*B60L 58/24* (2019.01)
(Continued)

(52) U.S. Cl.
CPC ............... *B60L 53/62* (2019.02); *B60L 58/24* (2019.02); *H01M 10/443* (2013.01);
(Continued)

(58) Field of Classification Search
CPC .. H02J 7/977; H02J 7/963; H02J 7/94; H01M 10/486; H01M 10/443; B60L 53/62; B60L 58/24
(Continued)

(56) References Cited

U.S. PATENT DOCUMENTS 5,606,242 A * 2/1997 Hull .......................... H02J 7/44 429/432
5,619,118 A * 4/1997 Reipur .................... H02J 7/963 320/156

(Continued)

FOREIGN PATENT DOCUMENTS

DE 102017222217 A1 6/2019
EP 0783200 B1 7/2003
EP 1249886 B1 6/2005

OTHER PUBLICATIONS

International Report on Patentability issued in corresponding International Application No. PCT/EP2022/069340, dated Feb. 6, 2024, pp. 1-7, English Translation.

(Continued)

*Primary Examiner* — John T Trischler
(74) *Attorney, Agent, or Firm* — Carter, DeLuca & Farrell LLP

(57) ABSTRACT

In a method for operating a battery, e.g., in a driverless transport vehicle, the battery is charged in a charging process starting from a start time; during the charging process at a number of measurement times a charging current flowing through the battery, a battery voltage applied to the battery and a battery temperature prevailing in the battery are measured; an amount of charge introduced into the battery is calculated from the charging current; a voltage gradient is calculated from the battery voltage and the amount of charge; a first end criterion is determined from a curve of the voltage gradient; a temperature gradient is calculated from
(Continued)

the battery temperature and the amount of charge; a second end criterion is determined from a curve of the temperature gradient; a temperature increase is calculated from a curve of the battery temperature; a third end criterion is determined if the temperature increase exceeds a threshold value; and the charging process is ended after at least one of the end criteria is present.

16 Claims, 2 Drawing Sheets

(51) Int. Cl.

| | |
|---|---|
| ***H01M 10/44*** | (2006.01) |
| ***H01M 10/48*** | (2006.01) |
| ***H02J 7/65*** | (2026.01) |
| ***H02J 7/90*** | (2026.01) |
| ***H02J 7/96*** | (2026.01) |
| *B60L 58/12* | (2019.01) |
| *H02J 7/94* | (2026.01) |

(52) U.S. Cl.
CPC ........... *H01M 10/486* (2013.01); *H02J 7/963* (2026.01); *H02J 7/977* (2026.01); *B60L 58/12* (2019.02); *H01M 10/44* (2013.01); *H01M 2220/20* (2013.01); *H02J 7/65* (2026.01); *H02J 7/94* (2026.01)

(58) Field of Classification Search
USPC .......................................................... 320/150
See application file for complete search history.

(56) References Cited

U.S. PATENT DOCUMENTS 5,789,903 A * 8/1998 Young .................. G01R 31/367 320/161
6,163,134 A * 12/2000 Powers ............... H01M 10/345 320/147
6,281,663 B1 * 8/2001 Yagi ........................ B60L 53/11 320/150
6,545,449 B2 4/2003 Ueda
7,145,314 B2 * 12/2006 Aradachi ................ H02J 7/865 320/150
8,866,444 B2 * 10/2014 Stewart .............. G01R 31/3648 320/134
9,937,816 B2 * 4/2018 Marchal .................. B60L 58/25
9,966,769 B2 * 5/2018 Srinivasan ........ H01M 10/0525
10,063,072 B2 * 8/2018 Tanaka ..................... B60L 50/51
10,393,817 B2 8/2019 Fraunhofer
10,534,028 B2 * 1/2020 Stewart .............. G01R 31/3648
11,964,570 B2 * 4/2024 Schäfer ...................... B60L 3/04
12,263,739 B2 * 4/2025 Hauck ........................ B60L 5/00
12,473,148 B2 * 11/2025 Hauck ...................... B60L 50/40
2002/0145402 A1 * 10/2002 Ueda ....................... B60L 15/38 320/104
2004/0232892 A1 * 11/2004 Aradachi ................ H02J 7/865 320/150
2006/0132099 A1 6/2006 Aradachi
2011/0298417 A1 * 12/2011 Stewart .............. G01R 31/3648 320/132
2014/0191731 A1 * 7/2014 Miura ................... H01M 10/44 320/157
2015/0039255 A1 * 2/2015 Stewart .............. G01R 31/3648 702/63
2016/0082860 A1 * 3/2016 Marchal .............. H01M 10/625 320/136
2016/0254687 A1 9/2016 Tanaka
2017/0074918 A1 * 3/2017 Stewart .............. G01R 31/3648
2017/0149256 A1 * 5/2017 Srinivasan ........ H01M 10/0525
2018/0011143 A1 * 1/2018 Bruch .................. G01R 31/396
2022/0410719 A1 * 12/2022 Schäfer ...................... B60L 3/04
2022/0410725 A1 * 12/2022 Hauck ........................ B60L 5/00
2023/0145693 A1 * 5/2023 Ju ........................ G01R 31/392 320/132
2023/0264894 A1 * 8/2023 Hauck ...................... B60L 50/40 307/10.1

OTHER PUBLICATIONS

International Search Report issued in corresponding International Application No. PCT/EP2022/069340 dated Oct. 24, 2022, pp. 1-2, English Translation.

* cited by examiner

METHOD FOR OPERATING A BATTERY

FIELD OF THE INVENTION

The present invention relates to a method for operating a battery, e.g., in a driverless transport vehicle.

BACKGROUND INFORMATION

Driverless transport vehicles are used in various technical facilities, for example, in supermarkets, industrial facilities, logistics centers, hospitals, and production plants. The driverless transport vehicles are used for transporting objects, for example. Driverless transport vehicles include an electrical energy storage unit for supplying the vehicle. The energy storage unit is provided in the form of a rechargeable battery. The vehicle is thus self-sufficient and can be operated independently in the technical facility.

When the battery is empty, the battery must be recharged. The vehicle usually has a battery management system to control and monitor the battery. One of the battery management system's tasks is to determine the battery's charge status. Knowing the current charge status makes it possible to predict how much energy can still be extracted before the battery is discharged. When the battery is being charged, knowing the current charge status makes it possible to predict how long the charging process will take until the battery is fully charged.

It is particularly difficult to calculate the current charge status for batteries with NiMH cells (nickel metal hydride), as these cells have a relatively poor correlation between a voltage applied and the charge status. The current charge status is calculated using an ampere-hour meter, for example, by integrating a current flowing through the battery. However, this type of calculation is prone to errors in the long term and there are deviations between the calculated charge status and the actual charge status. It is therefore necessary to regularly align the charge status in order to minimize deviations between the calculated charge status and the actual charge status.

A method for controlling charge to a secondary battery for an automatically guided vehicle is described in European Patent Document No. 1 249 886. The amount of charge in the secondary battery is controlled.

A battery charger is described in U.S. Patent Application Publication No. 2006/0132099. The battery charger includes a control unit for controlling a charging current depending on a battery voltage and a battery temperature.

A method for charging a battery is described in German Patent Document No. 10 2017 222 217. A battery charging process is started by a battery management system with a constant charging power to be provided.

German Patent Document No. 10 2018 005 843 describes a method for determining the state of charge of an energy storage cell, e.g., an electrochemical energy storage system. The voltage applied to the energy storage cell and the current of the energy storage cell are recorded. A state of charge is determined from an internal cell voltage and a charge-related voltage gradient.

SUMMARY

Example embodiments of the present invention provide a method for operating a battery, e.g., in a driverless transport vehicle.

According to example embodiments, in a method for operating a battery, e.g., in a driverless transport vehicle, the battery is charged starting from a start time in a charging process. During the charging process at a number of measuring times a charging current flowing through the battery, a battery voltage applied to the battery and a battery temperature prevailing in the battery are measured. An amount of charge introduced into the battery is calculated from the charging current. A voltage gradient is calculated from the battery voltage and the amount of charge, and a first end criterion is determined from a curve of the voltage gradient. A temperature gradient is calculated from the battery temperature and the amount of charge, and a second end criterion is determined from a curve of the temperature gradient. A temperature increase is calculated from a curve of the battery temperature and a third end criterion is determined if the temperature increase exceeds a threshold value. The charging process is ended after at least one of the end criteria is present.

Each of these end criteria is a criterion indicating that the battery is fully charged. If such an end criterion is present, it can be assumed that the battery is fully charged and therefore the charge status of the battery is known. For example, the determination of end criteria via voltage gradients and temperature gradients is considered to be particularly robust and reliable. The method described herein thus makes it possible to align the charge status. For example, the battery is fully charged immediately after alignment and the driverless transport vehicle can thus be used immediately.

According to example embodiments, the charging process is ended after at least two of the end criteria are present. It is possible that one of the specified end criteria is determined too early, namely before the battery is fully charged. If at least two of the specified end criteria are met, it can be assumed with greater certainty that the battery is fully charged. This prevents the charging process from being ended too early, i.e., before the battery is fully charged.

According to example embodiments, the charging process includes a first charging phase, in which the battery is charged with a constant charging voltage, a subsequent second charging phase, in which the battery is charged with a constant charging current, and a subsequent third charging phase, in which the battery is charged with the constant charging current. The end criteria are determined during the third charging phase.

In the first charging phase, a relatively high charging current flows, which increases the battery's charge status relatively quickly. In the second charging phase, a stabilization of the measured values, e.g., the charging current, the battery voltage and the battery temperature, occurs. In the third charging phase, the measured values are sufficiently stable and the end criteria can thus be determined with sufficient accuracy and reliability.

According to example embodiments, the first charging phase is started at the start time, and the second charging phase is started when the charging current equals a defined current limit value or falls below the current limit value, and the third charging phase is started after a defined period of time has elapsed. The current limit value is, for example, 0.1 C, 0.5 C, 1 C or 2 C. Here, 1 C is a current that fully charges an empty battery in one hour. The charging current flowing in the first charging phase is usually greater than 2 C. For example, the current limit value is equal to the constant charging current.

According to example embodiments, the temperature increase at each current measurement time is calculated as the difference between the battery temperature measured at the current measurement time and a battery temperature measured at the start of the second charging phase.

According to example embodiments, the amount of charge is calculated at each current measurement time by integrating the charging current over a period of time that has elapsed since a previous measurement time. The method is thus independent of the size of the charging current. The method can be implemented with relatively small charging currents, for example, 0.1 C, as well as with relatively large charging currents, for example, 2 C.

According to example embodiments, a voltage difference is calculated at each current measurement time from the battery voltage measured at the current measurement time and a battery voltage measured at the previous measurement time, and the voltage gradient is calculated as the quotient of the voltage difference and the amount of charge.

According to example embodiments, a temperature difference is calculated at each current measurement time from the battery temperature measured at the current measurement time and a battery temperature measured at the previous measurement time, and the temperature gradient is calculated as the quotient of the temperature difference and the amount of charge.

According to example embodiments, the first end criterion is determined from the curve of the voltage gradient when the voltage gradient has initially reached a peak value and then falls below an end value, the end value being smaller than the peak value.

According to example embodiments, the second end criterion is determined from the curve of the temperature gradient when the temperature gradient exceeds a maximum value.

According to example embodiments, an initial value of the temperature gradient is measured at a certain point in time, e.g., at the beginning of the third charging phase, and the maximum value is calculated from the initial value. For example, the maximum value is calculated at 300% of the initial value.

Further features and aspects of example embodiments of the present invention are explained in more detail below with reference to the appended schematic Figures.

DETAILED DESCRIPTION

Figure 1:
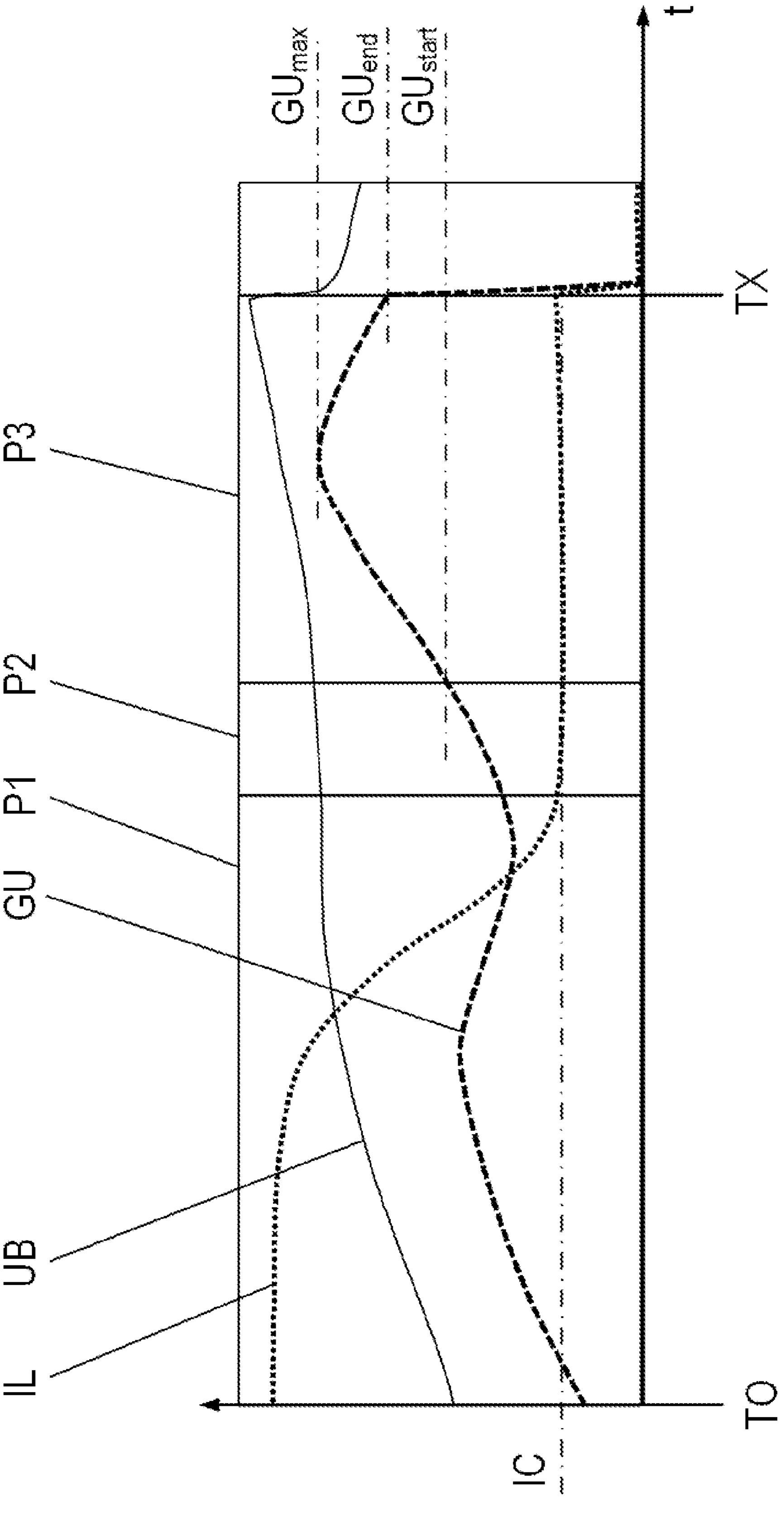
FIG. 1 graphically illustrates a voltage gradient over time during the charging process of a battery.

A battery in a driverless transport vehicle is being charged. The battery has NiMH (nickel metal hydride) cells. The charging process begins at a start time T0 and ends at an end time TX. During the charging process at a number of measurement times a charging current IL flowing through the battery, a battery voltage UB applied to the battery and a battery temperature TB prevailing in the battery are measured. The charging process includes a first charging phase P1, a subsequent second charging phase P2, and a subsequent third charging phase P3.

The first charging phase P1 is started at the start time T0. In the first charging phase P1, the battery is charged by an electrical energy source with a constant charging voltage. The energy source includes a series resistor. The battery voltage UB is thus lower than the charging voltage and increases with increasing charge of the battery. The charging current IL decreases as the charge of the battery increases.

The second charging phase P2 is started when the charging current IL equals a defined current limit value or falls below the current limit value. In the second charging phase P2, the battery is charged by the electrical energy source with a constant charging current IC. The current limit value is equal to the constant charge current IC. The battery voltage UB continues to rise as the charge of the battery increases. The second charging phase P2 lasts for a defined period of time, for example, one minute.

The third charging phase P3 is started after the defined period of time has elapsed. In the third charging phase P3, the battery continues to be charged by the electrical energy source with the constant charging current IC. The third charging phase P3 ends at the aforementioned end time TX.

During the third charging phase P3, an amount of charge ΔQ which has been introduced into the battery during a period of time since a previous measurement time MV is determined at each current measurement time MA. The amount of charge ΔQ is calculated by integrating the charge current IL over the time elapsed since the previous measurement time. The following applies to the calculation of the amount of charge ΔQ:

$$\Delta Q = \int_{t=MV}^{t=MA} IL\,dt$$

The previous measurement time MV is not necessarily immediately before the current measurement time MA. It is possible that there is a plurality of further measurement times between the current measurement time MA and the previous measurement time MV.

During the third charging phase P3, a voltage difference ΔU is also determined at each current measurement time MA. The voltage difference ΔU is calculated as the difference between the battery voltage UB measured at the current measurement time MA and a battery voltage UB measured at the previous measurement time MV. Furthermore, a voltage gradient GU is determined as the quotient of the voltage difference ΔU and the amount of charge ΔQ. The following applies to the calculation of the voltage gradient GU:

$$GU = \frac{\Delta U}{\Delta Q}$$

During the third charging phase P3, a temperature difference ΔT is also determined at each current measurement time MA. The temperature difference ΔT is calculated as the difference between the battery temperature TB measured at the current measurement time MA and a battery temperature TB measured at the previous measurement time MV. Furthermore, a temperature gradient GT is determined as the quotient of the temperature difference ΔT and the amount of charge ΔQ. The following applies to the calculation of the temperature gradient GT:

$$GT = \frac{\Delta T}{\Delta Q}$$

During the third charging phase P3, a temperature increase AT is also determined at each current measurement time MA. The temperature increase AT is calculated as the difference between the battery temperature TB measured at the current measurement time MA and a battery temperature TB measured at the start of the second charging phase P2.

FIG. 1 illustrates an example of a voltage gradient GU as well as a charging current IL and a battery voltage UB over time during the battery charging process. A time t is plotted on the abscissa and the corresponding measured values and calculated values are plotted on the ordinate.

A first end criterion is determined from the curve of the voltage gradient GU. The first end criterion is a criterion indicating that the battery is fully charged. The first end criterion is determined during the third charging phase P3 when the voltage gradient GU has first reached a peak value GUmax and then falls below an end value GUend. The peak value GUmax is a local maximum of the voltage gradient GU over the time t.

At the beginning of the third charging phase P3, a start value GUstart of the voltage gradient GU is also measured. As mentioned above, the peak value GUmax is a local maximum of the voltage gradient GU over the time t, and is thus greater than the start value GUstart. The peak value GUmax is also greater than the end value GUend.

For example, the peak value GUmax is measured over the curve of the voltage gradient GU, and the end value GUend is calculated from the peak value GUmax. For example, the end value GUend is calculated at 70% of the peak value GUmax.

For example, the end value GUend is specified before the start of the charging process. For example, the end value GUend is thus a constant.

Figure 2:
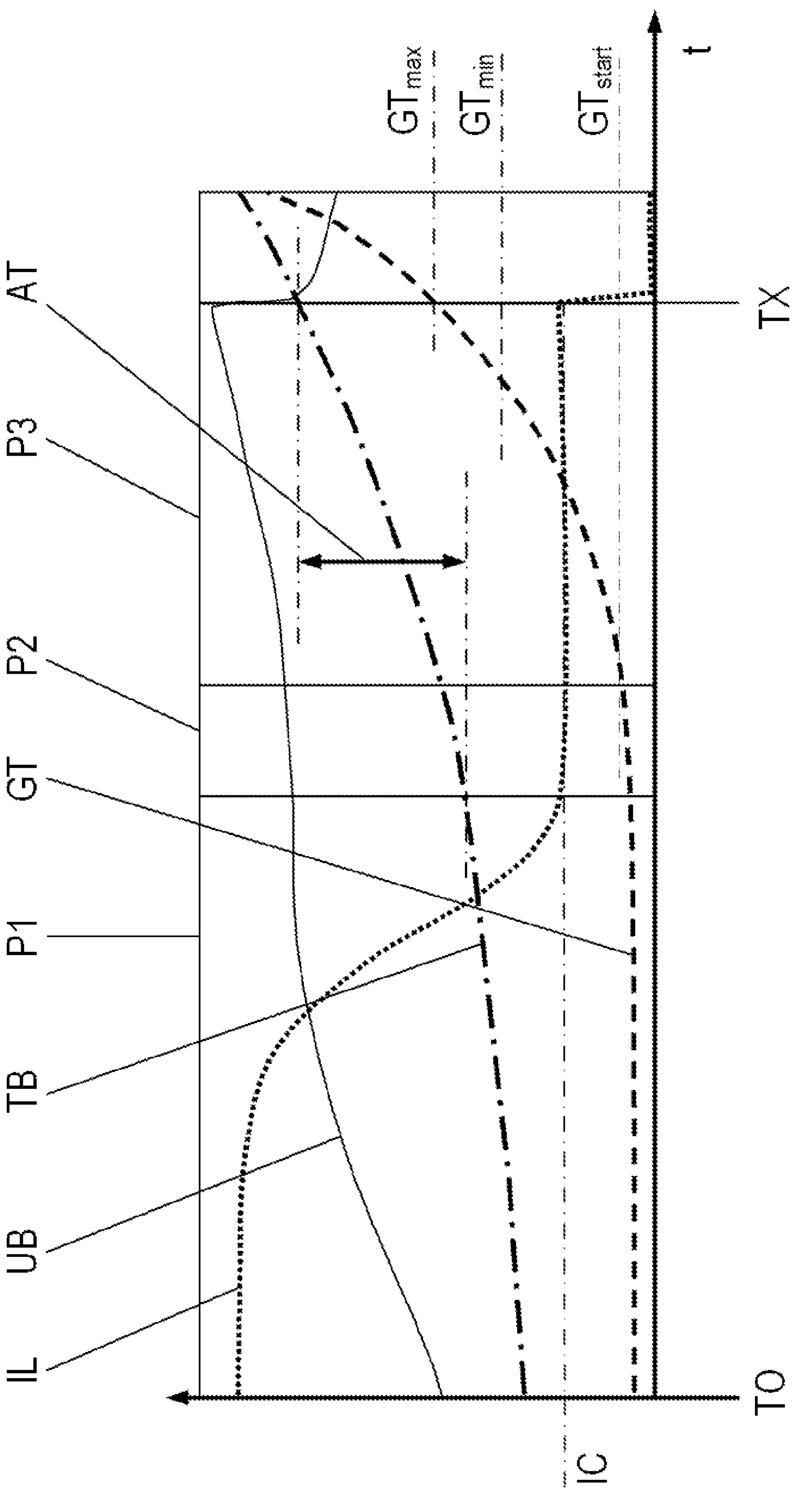
FIG. 2 graphically illustrates a temperature gradient over time during a charging process of a battery.

FIG. 2 illustrates an example of a temperature gradient GT as well as a charging current IL, a battery voltage UB, and a battery temperature TB over time during the battery charging process. A time t is plotted on the abscissa and the corresponding measured values and calculated values are plotted on the ordinate.

A second end criterion is determined from the curve of the temperature gradient GT. The second end criterion is another criterion indicating that the battery is fully charged. The second end criterion is determined during the third charging phase P3 when the temperature gradient GT exceeds a maximum value GTmax.

For example, an initial value GTstart of the temperature gradient GT is measured at the beginning of the third charging phase P3, and the maximum value GTmax is calculated from the initial value GTstart. For example, the maximum value GTmax is calculated at 300% of the initial value GTstart.

For example, the maximum value GTmax is specified before the start of the charging process. For example, the maximum value GTmax is thus a constant.

For example, the maximum value GTmax is greater than a minimum value GTmin, which is specified before the start of the charging process. The minimum value GTmin is thus a constant.

A third end criterion is determined from a curve of the battery temperature TB. The third end criterion is another criterion indicating that the battery is fully charged. The third end criterion is determined during the third charging phase P3 if the temperature increase AT exceeds a threshold value.

For example, the threshold value in question is specified before the start of the charging process. For example, the threshold value is thus a constant.

If at least two of the specified end criteria are present, the end time TX is reached and the charging process is ended. The battery is then disconnected from the electrical energy source. It is assumed that the battery is fully charged at the end time TX, at which at least two of the end criteria mentioned are present.

LIST OF REFERENCE CHARACTERS t Time
T0 Start time
TX End time
MA Current measurement time
MV Previous measurement time
P1 First charging phase
P2 Second charging phase
P3 Third charging phase
IL Charging current
UB Battery voltage
TB Battery temperature
ΔQ Amount of charge
ΔU Voltage difference
ΔT Temperature difference
AT Temperature increase
GU Voltage gradient
GT Temperature gradient
IC Constant charge current
GUstart Start value
GUmax Peak value
GUend End value
GTmax Maximum value
GTmin Minimum value
GTstart Initial value

The invention claimed is:

1. A method for operating a battery, comprising:
charging the battery, in a charging process, starting from a start time;
during the charging process at a number of measurement times, measuring a charging current flowing through the battery, a battery voltage applied to the battery, and a battery temperature;
calculating, from the charging current, an amount of charge introduced into the battery;
calculating, from the battery voltage and the amount of charge, a voltage gradient;
determining a first end criterion from a curve of the voltage gradient;
calculating, from the battery temperature and the amount of charge, a temperature gradient;
determining a second end criterion from a curve of the temperature gradient;
calculating, from a curve of the battery temperature, a temperature increase;
determining a third end criterion if the temperature increase exceeds a threshold value; and
ending the charging process after at least one of the end criteria is present.

2. The method according to claim 1, wherein the battery is arranged in a driverless transport vehicle.

3. The method according to claim 1, wherein the charging process is ended after at least two of the end criteria are present.

4. The method according to claim 1, wherein the first end criterion is determined from the curve of the voltage gradient when the voltage gradient has initially reached a peak value and then falls below an end value, the end value being smaller than the peak value.

5. The method according to claim 1, wherein the battery includes nickel metal hydride cells.

6. The method according to claim 1, wherein the second end criterion is determined from the curve of the temperature gradient when the temperature gradient exceeds a maximum value.

7. The method according to claim 6, wherein an initial value of the temperature gradient is measured at a certain point in time, and the maximum value is calculated from the initial value.

8. The method according to claim 7, wherein the charging process includes:

a first charging phase, in which the battery is charged with a constant charging voltage;

a subsequent second charging phase, in which the battery is charged with a constant charging current; and a subsequent third charging phase, in which the battery is charged with the constant charging current;

wherein the end criteria are determined during the third charging phase; and wherein the certain point in time corresponds to a beginning of the third charging phase.

9. The method according to claim 1, wherein the charging process includes:

a first charging phase, in which the battery is charged with a constant charging voltage;

a subsequent second charging phase, in which the battery is charged with a constant charging current; and a subsequent third charging phase, in which the battery is charged with the constant charging current; and wherein the end criteria are determined during the third charging phase.

10. The method according to claim 9, wherein the temperature increase at each current measurement time is calculated as a difference between the battery temperature measured at the current measurement time and a battery temperature measured at a start of the second charging phase.

11. The method according to claim 9, wherein the first charging phase is started at the starting time, the second charging phase is started when the charging current equals a defined current limit value or falls below the current limit value, and the third charging phase is started after a defined period of time has elapsed.

12. The method according to claim 11, wherein the temperature increase at each current measurement time is calculated as a difference between the battery temperature measured at the current measurement time and a battery temperature measured at a start of the second charging phase.

13. The method according to claim 1, wherein the amount of charge is calculated at each current measurement time by integrating the charging current over a period of time that has elapsed since a previous measurement time.

14. The method according to claim 13, wherein a temperature difference is calculated at each current measurement time from the battery temperature measured at the current measurement time and a battery temperature measured at a previous measurement time, and the temperature gradient is calculated as a quotient of the temperature difference and the amount of charge.

15. The method according to claim 13, wherein a voltage difference is calculated at each current measurement time from the battery voltage measured at the current measurement time and a battery voltage measured at a previous measurement time, and the voltage gradient is calculated as a quotient of the voltage difference and the amount of charge.

16. The method according to claim 15, wherein a temperature difference is calculated at each current measurement time from the battery temperature measured at the current measurement time and a battery temperature measured at a previous measurement time, and the temperature gradient is calculated as a quotient of the temperature difference and the amount of charge.

* * * * *